United States Patent Office 3,543,318
Patented Dec. 1, 1970

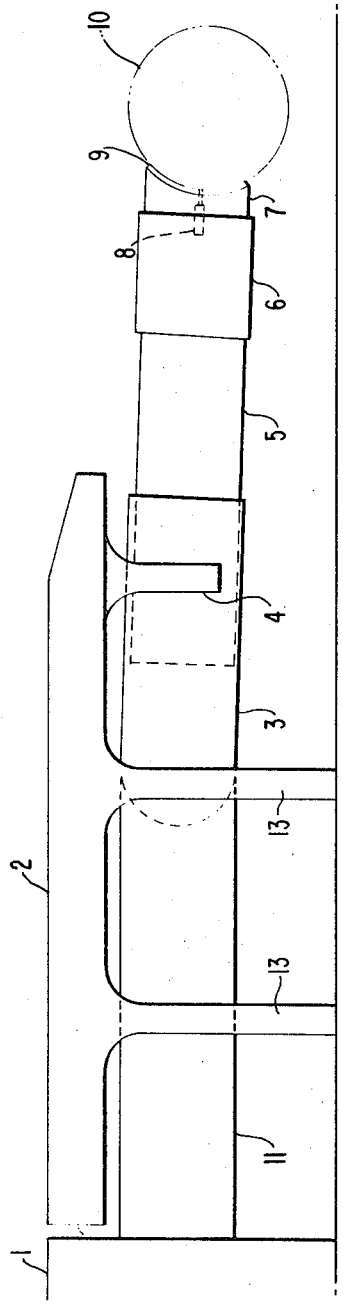
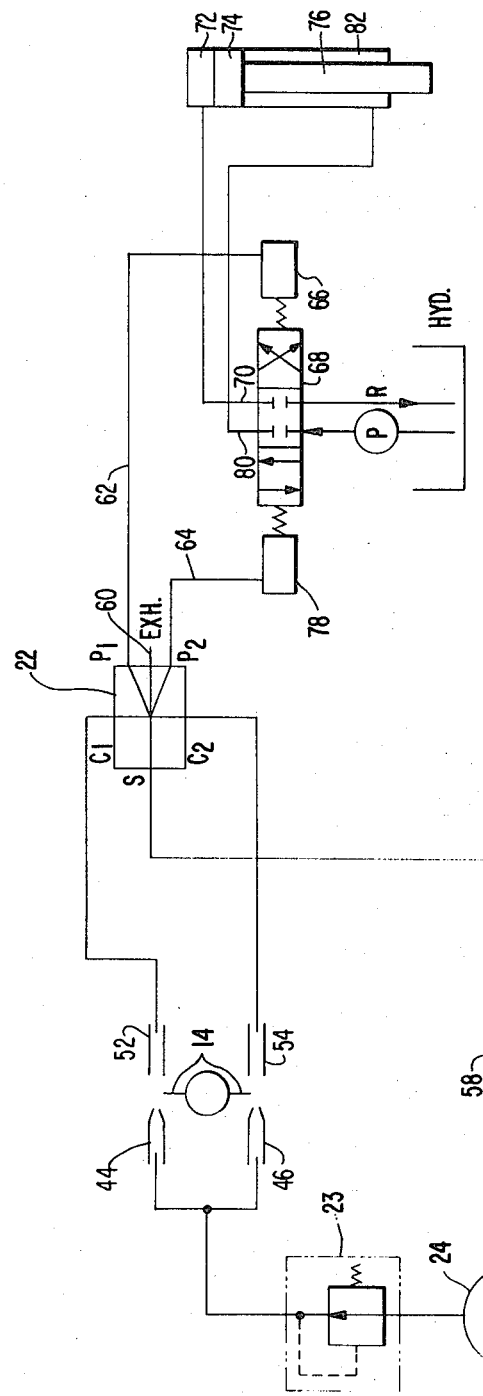

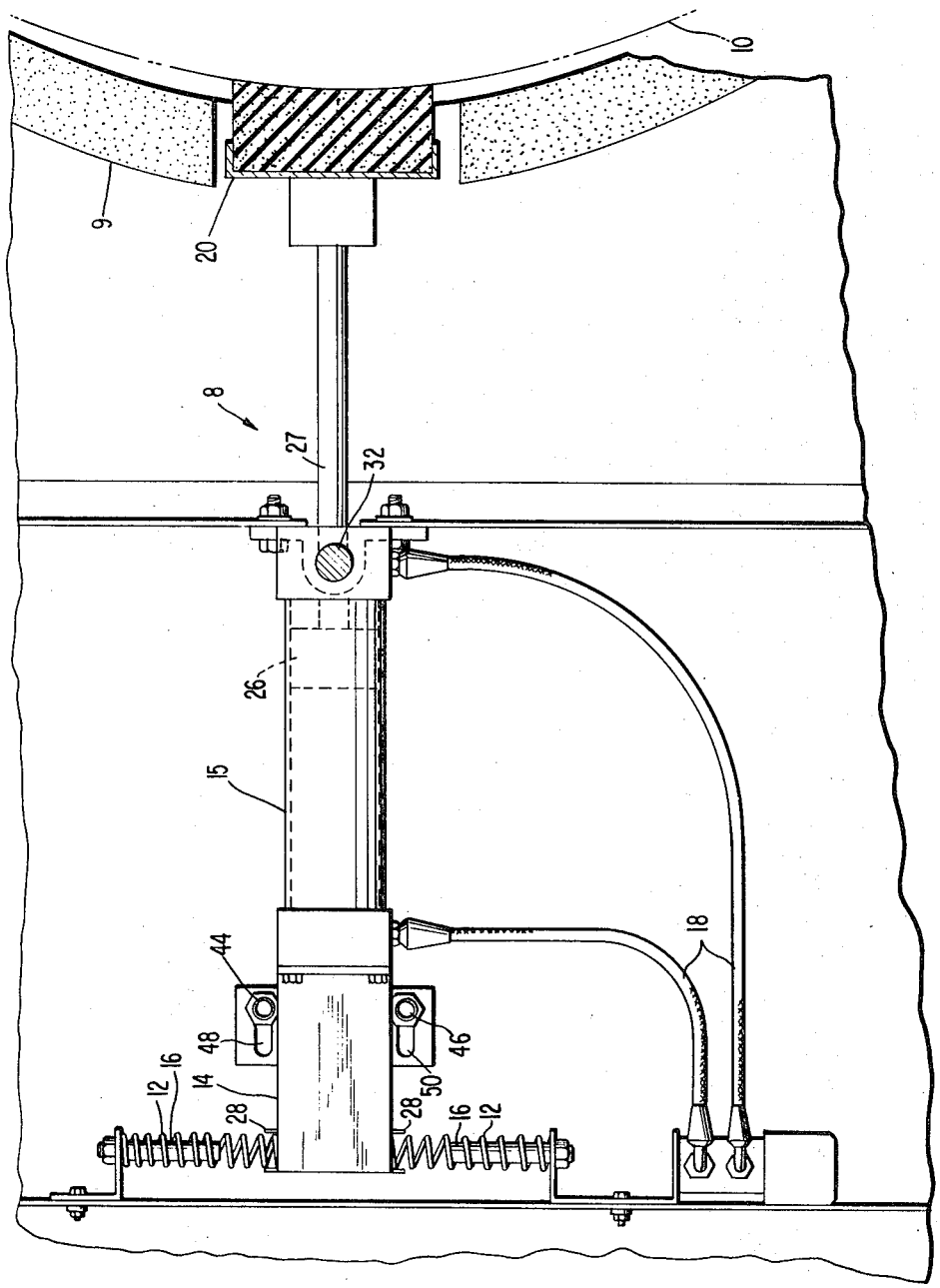

3,543,318
AUTOMATIC RELATIVE POSITION CONTROL DEVICE
Michael P. Tushim, Huntsville, Ala., assignor to Brown Engineering Company, Inc., a corporation of Alabama
Filed Apr. 15, 1969, Ser. No. 816,268
Int. Cl. B65g 11/00
U.S. Cl. 14—71         5 Claims

ABSTRACT OF THE DISCLOSURE

A conveyance loading bridge is raised and lowered in response to changes in the relative vertical position between the bridge and a conveyance such as an aircraft. The conveyance is contacted by a sensor which is movably mounted on the bridge. Vertical movement of the sensor moves a deflector with respect to a stream of fluid to initiate the raising or lowering of the bridge.

BACKGROUND

This invention relates to a system utilizing fluid operated means rather than electrical or mechanical means for sensing relative movement and changing the elevation in a structure in order to maintain its vertical alignment with another structure which has a varying elevation. The invention is ideally suited to use in conjunction with aircraft loading bridges which normally operate in areas of potential fire hazard, since this invention utilizes fluid controls rather than electrical controls for initiating the vertical movement of the bridge.

In the prior art, it has been recognized that aircraft passenger loading bridges must be raised and lowered periodically to maintain them in proper vertical alignment with the doorway of an aircraft, the height of which is changing as the aircraft is loaded or unloaded. Various proposals for automatically providing such adjustment are disclosed in U.S. Pats. 3,038,185; 3,086,152 and 3,310,823. These prior systems are all characterized by electrical switches which sense the relative positioning between the conveyance bridge and the aircraft in order to control the raising or lowering of the bridge.

SUMMARY

According to this invention, the use of potentially hazardous electrical controls is avoided by employing a mechanical detector which senses relative vertical movement between two vertically movable structures. Fluid-operated devices generate a signal in response to movement of the detector in order to initiate the raising or lowering of the platform.

The mechanical sensing detector of the preferred embodiment carries a fluid deflector which is movable into the path of a stream of fluid passing between a fluid discharge means and a fluid receiving means. Changes in the stream generate signals which result in the appropriate raising or lowering of the vertically adjustable platform.

More specific details of one suitable embodiment of the invention are disclosed in the following description.

THE DRAWINGS

FIG. 1 is a side elevation of a suitable environment for the invention;

FIG. 2 shows the sensing portion of an automatic relative position control device constructed according to the invention; and FIG. 3 is a schematic view of the fluidic control circuitry used in conjunction with the apparatus of FIG. 2.

DESCRIPTION OF THE PREFERRED EMBODIMENT

A suitable environment for this invention is in conjunction with passenger loading bridges at airport terminal facilities. A novel loading bridge which, except for the relative position control mechanism, forms no part of this invention is shown in FIG. 1 where an overhead canopy 2 is immediately adjacent to a terminal building 1 and is supported by pairs of vertical columns 13. Between transversely opposed pairs of the vertical columns 13 and beneath the canopy 2, a stationary tunnel 11 extends outwardly from a door in the wall of the terminal building. The outer end of the stationary tunnel section 11 connects to an adjustable walkway which is supported so that its outer end is capable of vertical and horizontal movement. This walkway includes an articulated tunnel section 3, a telescoping tunnel section 5 which is retractable into the tunnel section 3, and a cab or vestibule section 6 which may be mounted for rotation about a vertical axis with respect to the tunnel section 5. The portion of the walkway at the cab 6 is movable into alignment with a door of a conveyance such as the aircraft shown diagrammatically at 10. A weather hood 7 which may be made of flexible material with a resilient seal 9 is attached to the cab.

Vertical and horizontal movement is imparted to the elements 3, 5 and 6 by hydraulic cylinders (not shown) associated with the tunnel support members 4 which depends from the canopy 2. The support members 4 themselves may be movable in a horizontal path transverse to the tunnel section 3 to swing the tunnel section 3 horizontally with respect to the stationary tunnel 11. Vertical hydraulic rams within the members 4 may be connected to the tunnel section 3 to provide the desired vertical movement.

It is well known that as an aircraft is loaded or unloaded, its vertical position will change, thus necessitating some means for changing the vertical position of the cab 6 so that it will remain in alignment with the door of an aircraft. Formerly, this has been accomplished by electrical sensing mechanisms which detect changes in the relative vertical position of the aircraft 10 and cab 6. Such electrical controls must be located within relatively expensive housings or they will introduce a potential fire hazard, especially since they are used in the vicinity of the volatile fuels used by aircraft.

Various mechanical devices may be used to sense the relative positioning of the cab 6 and an aircraft 10. One suitable device 8 for this purpose is shown in FIG. 2 where the skin of the aircraft 10 is contacted by a friction bumper 20 mounted on the end of a piston rod 27. The piston 26 is attached to the rod 27 and moves longitudinally within a hydraulic or pneumatic cylinder 15. By selectively pressurizing and relieving the control hoses 18, the piston 26 may be moved to extend or retract the friction bumper 20 from engagement with an aircraft.

The cylinder 15 is mounted for swinging movement on a pivot rod 32 which is at a fixed position on the cab. When the friction bumper 20 is in engagement with an aircraft, any relative movement between the cab and the aircraft will produce vertical swinging movement of the cylinder 15.

A deflector plate 14 is affixed to the left end of cylinder 15 so that it will move vertically upon swinging movement of the cylinder 15. The deflector is biased toward a central position by helical compression springs 12. The springs 12 are held in position by retainer flanges 28 on the deflector 14 and by axial plugs 16 which are mounted on brackets attached to the cab structure.

The position of the deflector 14 is, of course, reflective of changes in the relative position between the aircraft and the cab. In order to create a signal indicative of the position of the deflector 14, there are pairs of fluid discharge nozzles and fluid receiving nozzles aligned on opposite sides of the neutral position of the fluid deflector 14. A pair of fluid discharging nozzles 44 and 46 are shown in the view of FIG. 2 where they are mounted in elongated slots 48 and 50 to permit adjustment.

The principle of operation of the nozzle and receiver arrangement of this preferred embodiment will be understood by referring to FIG. 3 where the nozzles 44 and 46 are shown in alignment with respective pairs of fluid receiver conduits 52 and 54. The deflector 14 is movable upwardly from its illustrated neutral position to a point where it will interrupt the stream which passes from the nozzle 44 to the receiver 52, thus affecting the pressure in the receiver 52. Likewise, depression of the deflector 34 will interrupt the stream passing from nozzle 46 to receiver 54 and reduce the pressure in the receiver 54. Referring back to FIG. 2, it will be observed that downward movement of the deflector 14 indicates that the aircraft has raised and therefore that the cab must also be raised. This elevation of the cab is initiated by the system shown in FIG. 3 where compressed air from a source 24 passes through a pressure reducing regulator 23 to both of the nozzles 44 and 46 where it is released at equal pressures. When the deflector 14 is in its neutral position as shown in FIG. 3, the stream emitted by the nozzles 44 and 46 will generate equal pressures in the fluid receivers 52 and 54 which are in communication with control ports $C_1$ and $C_2$ of a directional sensing device shown in diagrammatic form at 22. This sensing device may be a conventional pilot valve actuated by relatively low pressure air at the control ports $C_1$ and $C_2$ to direct relatively high pressure air arriving at port S from the source 24 through conduit 58. When the pressures at ports $C_1$ and $C_2$ are equal, the directional sensing device 22 is balanced and the compressed air arriving at the port S is discharged to the atmosphere through a exhaust line 60. However, when there is a pressure differential between the control ports $C_1$ and $C_2$, the device 22 directs the air arriving at port S into either of the discharge lines 62 or 64. For example, when the deflector 14 moves upwardly from its neutral position and reduces the pressure arriving at the fluid receiver 52, the device 22 will route the relatively high pressure air from port S to the discharge port $P_1$ and into the line 62. This fluid has a sufficient pressure to move the valve actuator 66 and to shift the movable valve member diagrammatically shown at 68 to the left thereby introducing pressurized fluid into the line 70 which leads to the space 72 above piston 74. The rod 76 of the piston 74 is connected to the articulated tunnel section 3 shown in FIG. 1 and therefore lowers the tunnel section.

Conversely, elevation of the aircraft and lowering of the deflector 14 will reduce the pressure in the receiver 54 and shift the device 22 so that the high pressure air at port S is routed to the discharge port $P_2$ and into the line 64 leading to the valve actuator 78. Movement of the valve 68 to the right will result in the introduction of pressurized fluid to the line 80 leading to the chamber 82 beneath the piston 74, thus elevating the articulated tunnel section 3 and the cab 6.

The foregoing description pertains only to a preferred embodiment of the invention and does not include many variations thereto which will occur to persons working in this field. The invention may be used in conjunction with many diverse forms of relatively movable structures and is not limited to only use with aircraft loading bridges. Rather than using air and the disclosed fluidic devices for sensing the position of a mechanical movement detector, hydraulic fluid and proportional directional control valves may be used. Other variation to the suggested forms of the invention are expected to result from the ordinary development of the art. Accordingly, the invention is not limited to the specific embodiments shown, but encompass all variations and modifications thereto which fall within the spirit of the following claims.

What is claimed is:
1. Apparatus comprising a vertically adjustable walkway supported for vertical and horizontal movement into alignment with a vertically movable structure,
   a sensing element extending from the walkway for contacting the vertically movable structure to detect variations in the relative vertical positions of the walkway and the structure, said sensing element having an outer portion which is movable with respect to the walkway in upward and downward directions from a neutral position,
   a fluid deflector operatively connected to and simultaneously movable with the outer portion of the sensing element, whereby said fluid deflector will assume a neutral position when the sensing element is in its neutral position,
   fluid discharge means for releasing a stream of fluid,
   fluid receiving means in the path of the stream for intercepting the stream,
   said deflector being movable into the path of said stream to affect the stream passing to the fluid receiving means, and
   means for vertically moving the walkway in response to variations produced in the stream by movement of the deflector.

2. Apparatus according to claim 1 having a pair of said fluid receiving means located adjacent to the deflector,
   said means for vertically moving the walkway being responsive to variations in the flow of fluid arriving at one fluid receiving means to elevate the walkway, and being responsive to variations in the flow arriving at the other fluid receiving means to lower the walkway.

3. Apparatus according to claim 2 having means for detecting the existence of a pressure differential between the two fluid receiving means and emitting a signal reflecting the direction of the differential, said means for vertically moving the walkway being responsive to said signal.

4. Apparatus according to claim 2 having a pair of said fluid discharging means each being aligned with its respective one of the fluid receiving means.

5. Apparatus according to claim 1 having a source of gaseous fluid connected to the fluid discharging means.

References Cited

UNITED STATES PATENTS

| | | | |
|---|---|---|---|
| 2,846,703 | 8/1958 | Adley | 14—71 |
| 2,875,457 | 3/1959 | Read | 14—71 |
| 2,881,458 | 4/1959 | Rodgers | 14—71 |
| 3,038,185 | 6/1962 | Moore | 14—71 |
| 3,099,847 | 8/1963 | Lodjic | 14—71 |
| 3,310,823 | 3/1967 | Preiss | 14—71 |
| 3,317,942 | 5/1967 | Wollard | 14—71 |
| 3,369,264 | 2/1968 | Kurka | 14—71 |

NILE C. BYERS, JR., Primary Examiner